US005249363A

United States Patent [19]

Mitrega et al.

[11] Patent Number: 5,249,363

[45] Date of Patent: Oct. 5, 1993

[54] GUIDE BAR HAVING A LAMELLAR ASSEMBLY AND METHOD OF MAKING THE SAME

[75] Inventors: David Mitrega, Winnenden; Walter Sattelmaier, Ludwigsburg; Klaus Wieninger; Norbert Apfel, both of Waiblingen; Roland Schierling, Affalterbach; Bernd Andress, Erdmannhausen, all of Fed. Rep. of Germany

[73] Assignee: Andreas Stihl, Waiblingen, Fed. Rep. of Germany

[21] Appl. No.: 894,639

[22] Filed: Jun. 5, 1992

[30] Foreign Application Priority Data

Jun. 7, 1991 [DE] Fed. Rep. of Germany ....... 4118664

[51] Int. Cl.[5] ........................................ B23D 57/02

[52] U.S. Cl. ........................................ 30/387

[58] Field of Search ........................ 30/381, 383, 387; 83/821

[56] References Cited

U.S. PATENT DOCUMENTS

| | | | |
|---|---|---|---|
| 2,962,061 | 11/1960 | Nielsen | 30/387 |
| 3,416,578 | 12/1968 | Irgens | 30/387 |
| 3,949,475 | 4/1976 | Tokarz | 30/387 |
| 4,393,590 | 7/1983 | Pantzar | 30/387 |
| 4,693,007 | 9/1987 | Apfel et al. . | |
| 4,903,410 | 2/1990 | Wieninger e al. . | |
| 4,961,263 | 10/1990 | Apfel et al. | 30/387 |
| 5,025,561 | 6/1991 | Sugihara et al. | 30/387 |

FOREIGN PATENT DOCUMENTS

| | | | |
|---|---|---|---|
| 657445 | 2/1963 | Canada | 30/387 |
| 728639 | 10/1942 | Fed. Rep. of Germany | 30/387 |

*Primary Examiner*—Douglas D. Watts
*Assistant Examiner*—Paul M. Heyrana, Sr.
*Attorney, Agent, or Firm*—Walter Ottesen

[57] ABSTRACT

The invention is directed to a guide bar for guiding the saw chain of a motor-driven chain saw. The guide bar of the invention has a lamellar configuration and is not made of three parts as are conventional guide bars. Instead, the guide bar of the invention is made of two side parts. The two side parts are connected by means of spacers which are configured as projections on at least one of the two side parts. The side parts can be frames having large inner openings and are preferably stiffened. The connected frames define a composite frame which can be filled with plastic. The spacers determine the spacing of the side parts and therefore the width of the guide groove for the saw chain. The invention is also directed to a method of making the guide bar.

32 Claims, 7 Drawing Sheets

A
B
X
XI
XII
a
1
2
3
5
6
17
18
19
20
21
22a

6 / 7

GUIDE BAR HAVING A LAMELLAR ASSEMBLY AND METHOD OF MAKING THE SAME

FIELD OF THE INVENTION

The invention relates to a guide bar having a lamellar assembly and a guide groove extending about the periphery thereof for the saw chain of a motor-driven chain saw. The guide bar includes two parallel side parts rigidly connected to each other which conjointly define a spacing about the periphery corresponding to the width of the guide groove. The side parts are held together by means of spacers which support the side parts relative to each other. The invention also relates to a method of making the guide bar.

BACKGROUND OF THE INVENTION

Known guide bars of the kind described above have a three-layer assembly and are disclosed in U.S. Pat. No. 4,693,007 and 4,903,410. Accordingly, these guide bars include two side parts and a center part arranged between the side parts. The center part supports the side parts with respect to each other and defines a spacer which fixes the spacing which corresponds to the width of the guide groove. The guide bar is made as light as possible but yet is nonetheless configured to be stable with respect to bending and torsion loads. This is achieved by configuring the center part as a frame which is filled with plastic as disclosed in U.S. Pat. No. 4,693,007. The two side parts can be configured as frames as disclosed in U.S. Pat. No. 4,903,410. However, in each case, a three-layer assembly is provided in all lamellar guide bars; that is, the center part is required.

SUMMARY OF THE INVENTION

It is an object of the invention to simplify the assembly of the guide bar in such a manner that the weight thereof is likewise as low as possible while at the same time providing adequate stability. It is also an object of the invention to provide a method of making the guide bar.

The guide bar of the invention is for guiding the saw chain of a chain saw and includes two mutually adjacent elongated parallel side parts defining respective side frames having a predetermined length and being spaced from each other at a predetermined spacing to conjointly define an outer peripheral guide groove for guiding the saw chain on the guide bar; each of the side frames having an inner periphery defining an opening and each of the frames having upper and lower continuous legs extending longitudinally over most of the length of the guide bar; the two upper legs of the side frames conjointly defining an upper segment of the guide groove over most of said length and the two lower legs of the side frames conjointly defining a lower segment of the guide groove over most of said length; each of the legs having an inner edge defining a portion of the inner periphery of said opening; and, a plurality of projections formed on the inner edges of at least one of the side frames to define a plurality of spacers for holding the side frames at said spacing and for rigidly joining the side frames to each other to define a composite frame.

The lamellar guide bar according to the invention is essentially made of two parts and comprises only the two side parts and a light filler when these two side parts are formed as a frame. The guide groove is formed in that the spacers are formed as projections on one or both side parts. The projections are directed toward the other side part and determine the spacing between the side parts with the spacing corresponding to the width of the guide groove.

The two-part assembly makes possible an especially economical manufacture of the guide bar. The invention therefore also relates to a method for producing the guide bar. The side parts are first cut from solid material and thereafter are formed at the locations provided as spacers and are stamped to produce cutouts and are thereafter connected to each other.

The two side parts can be made the same so that they can be assembled by turning over the one side part about its longitudinal center axis and then connecting the two parts to each other. In this way, the manufacture of the guide bar is especially economical.

BRIEF DESCRIPTION OF THE DRAWINGS

The invention will now be described with reference to the drawings wherein.

DESCRIPTION OF THE PREFERRED EMBODIMENTS OF THE INVENTION

Figures 1, 2, 3, 4, 5, 6:
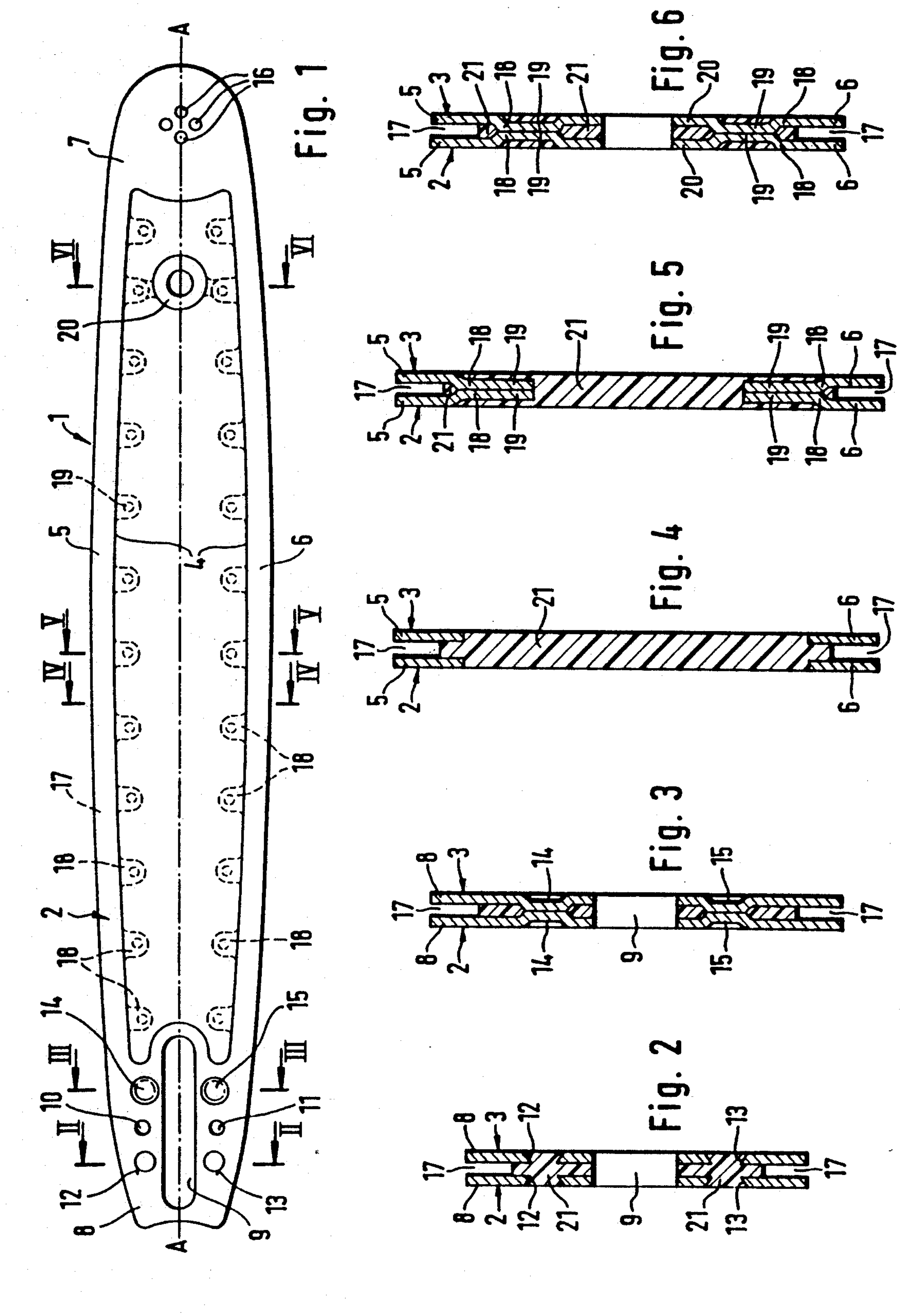
FIG. 1 is a side elevation view of a guide bar according to a first embodiment of the invention.
FIG. 2 is a section view taken along line II—II of FIG. 1.
FIG. 3 is a section view taken along line III—III of FIG. 1.
FIG. 4 is a section view taken along line IV—IV of FIG. 1.
FIG. 5 is a section view taken along line V—V of FIG. 1.
FIG. 6 is a section view taken along line VI—VI of FIG. 1.

FIG. 1 shows a side elevation view of a guide bar 1 and different section views of this guide bar are provided in FIGS. 2 to 6. The guide bar has two side parts 2 and 3 which are made of metal such as steel. The side parts each have a continuous cutout extending over the length thereof to thereby define a frame having narrow longitudinally extending legs 5 and 6. The two side parts are rigidly joined at a nose portion 7 at one end of the guide bar and at a clamping portion 8 at the other end thereof. The clamping portion 8 contains the conventional elongated slot 9 for attaching the guide bar to the motor-driven chain saw and also includes two lubricating oil bores 10 and 11. Furthermore, two rivet holes 12 and 13 (FIG. 2) are provided in each side part and two depressions 14 and 15 (FIG. 3) are also provided in each side part which serve to join the two side parts. The two side parts are connected by rivets 16 at the nose portion 7. The rivets 16 also hold a bearing disposed between the two side parts with the bearing being for a nose sprocket (not shown) for the saw chain (not shown).

The two side parts 2 and 3 have longitudinal legs 5 and 6 which define the lateral boundary of a peripheral guide groove 17 which extends over the entire length of these longitudinal legs 5 and 6 and the nose portion 7 connecting the two side parts. The guide groove 17 accommodates and guides the saw chain (not shown).

The spacing between the side parts 2 and 3 determines the width of the guide groove 17. This spacing is achieved by means of spacers which constitute portions of the two side parts. In the embodiment of the guide bar shown in FIGS. 1 to 6, tongues 18 are provided on the longitudinally extending legs 5 and 6 of the frame 4. These tongues 18 extend in the direction toward the longitudinal center plane A—A of the guide bar which runs perpendicular to the outer surfaces of the side parts. The tongues 18 have projections 19 which are directed inwardly and which define spacers to provide the spacing between the side parts 2 and 3. Two mutually adjacent tongues 18 are disposed near the nose portion 7 and are each configured as a single piece with the connecting strut 20 which widens to define a center bearing opening.

In the embodiment of FIGS. 1 to 6, the mutually adjacent spacers 19 are connected by welding as will be explained further below. The two depressions 14 as well as the two depressions 15 are also welded to each other. The depressions hold the two clamping portions 8 likewise at a spacing (FIG. 3) corresponding to the width of the groove. In the region of the rivet holes 12 and 13, the spacing between the two side parts is produced by a rivet connection. In this embodiment, the rivet connection is made of plastic. Welded depressions in the manner shown in FIG. 3 can however also be used at these locations.

The center opening surrounded by the frame 4 is made as large as possible to save weight and is filled with plastic 21 in the embodiment shown. The plastic is preferably injected after joining the two side parts and, as shown in FIGS. 2 to 6, this plastic defines the base of the guide groove 17. The plastic covers the tongues 18 at the spacers 19 which are offset inwardly so that the side surfaces of the guide bar are completely planar. One or more appropriately preformed plastic plates can be used for filling out the frame 4 in lieu of the injected plastic.

The side parts 2 and 3 are axially symmetrical with reference to the longitudinal center plane A-A. Accordingly, two side parts configured so as to be completely the same can be joined together by turning over one of the two side parts so that the two parts are arranged as shown. The production of the guide bar is especially economical because of this same configuration of the two side parts.

Figure 7:
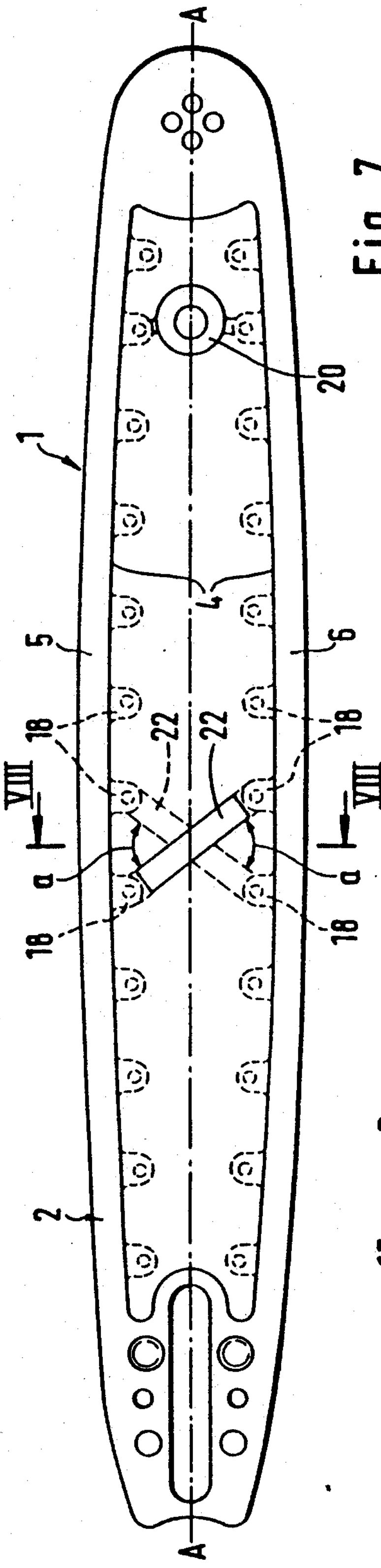
FIG. 7 is a side elevation view of a guide bar according to a second embodiment of the invention and includes transverse struts.
Figure 8:
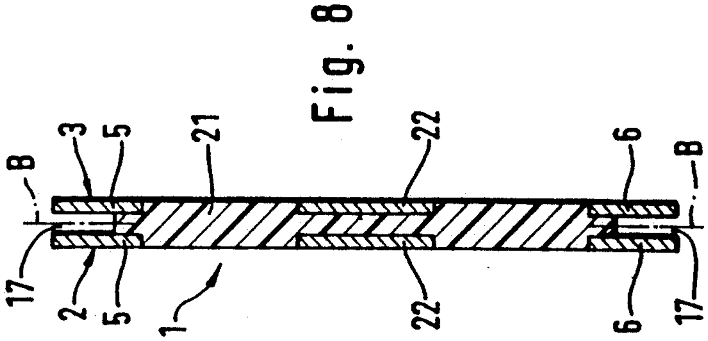
FIG. 8 is a section view taken along line VIII—VIII of FIG. 7.

The guide bar of FIGS. 7 and 8 is distinguished from the embodiment described in that each side part 3 and 4 includes a transverse strut 22 which joins the two tongues 18 on the two longitudinal legs 5 and 6 with each other. The transverse strut 22 extends diagonally to the longitudinal center plane A—A with the two connecting tongues 18 being displaced relative to each other by the spacing between two tongues provided on the longitudinal struts 5 and 6. In this embodiment too, the two side parts 2 and 3 are configured relative to the longitudinal center plane A—A so that they can be joined by turning over one of the side parts. The two side parts are then congruent except for the two transverse struts 22 which cross each other after the side parts are joined to each other as shown in FIG. 7. As in the embodiment of FIG. 1, the tongues 18 are provided at equal spacings on the longitudinally extending legs 5 and 6 which are so dimensioned that the necessary joining strength of the two side parts is guaranteed while considering the material of which they are made and the material thickness as well as the nature of the connection of the spacers. In the embodiment shown, the spacing between two tongues is approximately twice the tongue width. Twelve tongues 18 are provided for each of the longitudinally extending legs 5 and 6.

Each transverse strut 22 connects two center tongues 18 of the legs 5 and 6, respectively, with the tongues 18 being mutually adjacent and lying diagonally with respect to each other. These tongues 18 extend similarly offset from the longitudinally extending legs 5 and 6 as shown in FIG. 5. Each tongue extends with a further offset into the corresponding transverse strut 22. For this reason, the outer surface of the transverse strut 22 is in the same plane as the outer surfaces of the corresponding longitudinally extending legs 5 and 6 of the side parts as shown in FIG. 8. The transverse struts 22 and the longitudinally extending legs 5 and 6 are flush with the injected or inserted plastic 21 as shown in FIG. 8. The transverse struts 22 have the same thickness as the legs 5 and 6. The transverse struts 22 are at a spacing from each other because of the angular offset of the tongues 18. This spacing corresponds to the width of the guide groove 17 as also shown in FIG. 8. However, at this crossover location, a connection connecting the two transverse struts 22 can also be provided, for example, by depressions corresponding to the depressions 14 and 15 of FIGS. 1 and 3 or also by means of a rivet connection formed by means of rivet holes and the plastic extending through these rivet holes with this rivet connection corresponding to the filled rivet holes 12 and 13 of FIG. 2.

The transverse struts 22 should in any event lie on the outer sides of the guide bar 1 along their longest lengths so that the struts 22 have the largest possible spacing from the center plane B—B parallel to the outer surfaces. In this way, the transverse struts 22 can accommodate tensile and compressive forces which occur during bending loads applied to the guide bar so that the two frames 4 are stiffened by means of the transverse struts 22. It is advantageous that the two transverse struts 22 cross each other for taking up the tensile and compressive forces since then, the tensile forces taken up during bending loads by the one side of the guide bar at the affected transverse strut 22 correspond to the compressive forces which have to be taken up by the transverse strut 22 lying on the other side of the guide bar. The location of the transverse struts 22 on the outer side of the guide bar 1 furthermore has the advantage that the outer surfaces of the transverse struts made of metal form a part of the guide bar surfaces so that the resistance to abrasion of these outer surfaces is increased.

FIGS. 9 to 12 show an embodiment wherein several transverse struts 22*a* are provided with each frame 4. In the embodiment shown, every second tongue 18 of the longitudinally extending legs (5, 6) is configured so as to be one piece with a transverse strut 22*a* offset from the tongue. The transverse strut 22*a* connects this tongue to a tongue 18 of the other longitudinally extending leg lying diagonally opposite this tongue. Accordingly, there are five transverse struts 22*a* per frame 4 for the pregiven number of tongues.

Figures 9, 10, 11, 12:
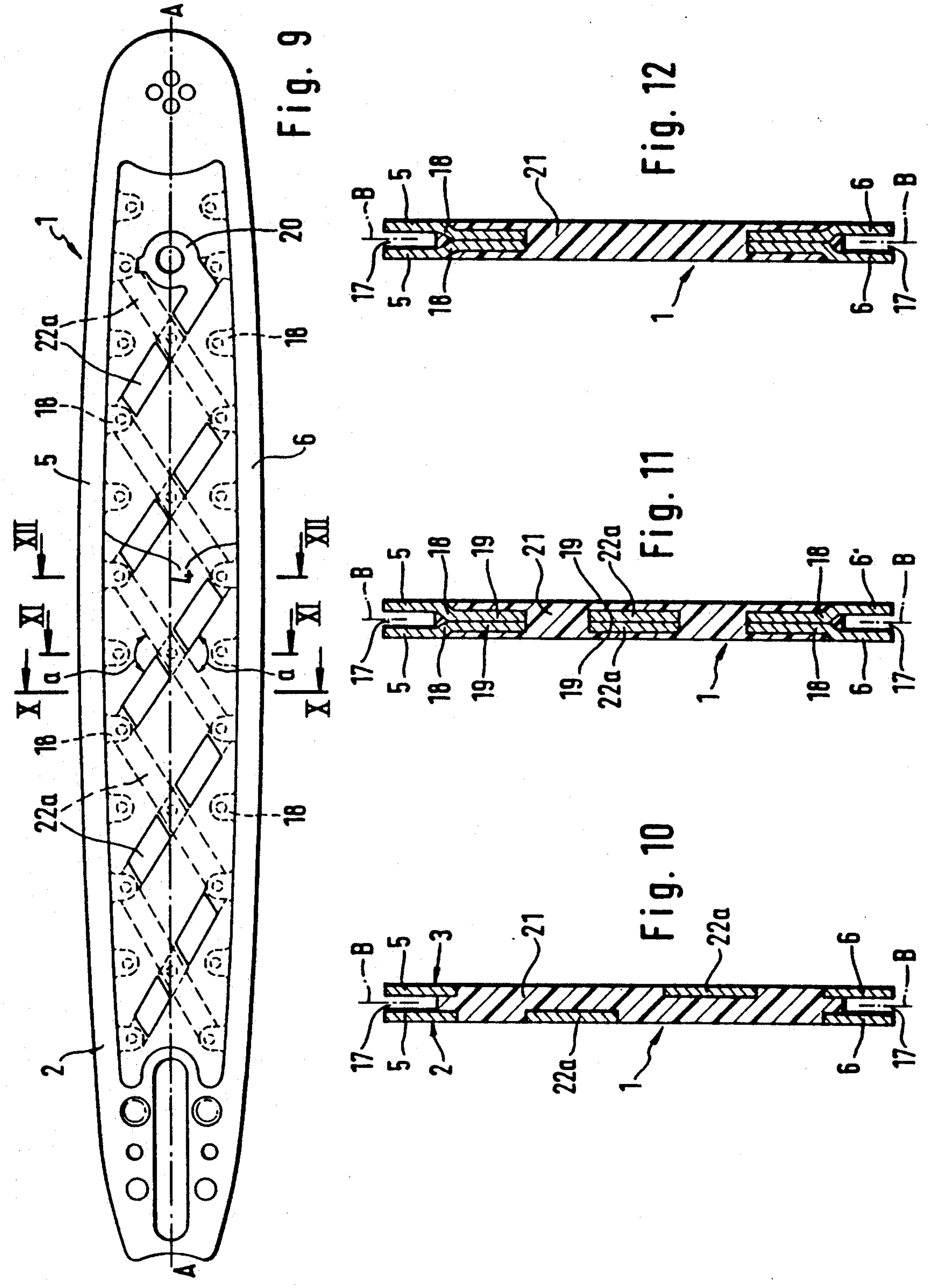
FIG. 9 is a side elevation view of a guide bar according to a third embodiment of the invention and is equipped with several transverse struts.
FIG. 10 is a section view taken along line X—X of FIG. 9.
FIG. 11 is a section view taken along line XI—XI of FIG. 9.
FIG. 12 is a section view taken along line XII—XII of FIG. 9.

As shown in FIGS. 10 and 11, the transverse struts 22*a* are offset inwardly at their crossover location and at this location define spacers 19 as do the tongues 18. For this reason, the spacers 19 lie with only a portion of their length on the outer sides of the guide bar 1 (FIG. 10). However, the spacers could be arranged over the entire length at a distance from the center plane B—B in the same manner as the struts 22 of FIGS. 7 and 8. The arrangement of several strut pairs with mutually crossing transverse struts 22*a* according to FIG. 9 provides an especially high bending stiffness and torsion stiffness of the guide bar. The angles (a) are each approximately 120° and are formed by the strut pairs 22*a* and open in the direction toward the longitudinally extending legs 5 or 6. The corresponding angles (a) of FIG. 7 are approximately 60°. These angles are especially advantageous for each of the embodiments shown in FIGS. 7 and 9 with respect to taking up the compression and tensile forces.

Figure 17:
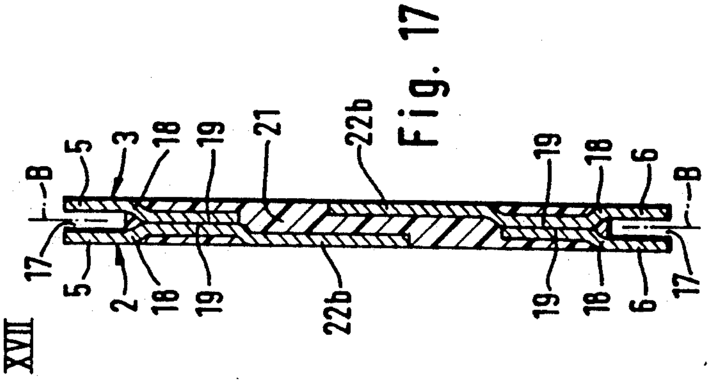
FIG. 17 is a section view taken along line XVII—XVII of FIG. 14.
Figure 16:
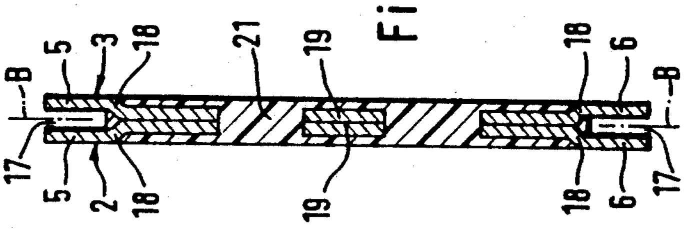
FIG. 16 is a section view taken along line XVI—XVI of FIG. 14.
Figure 15:
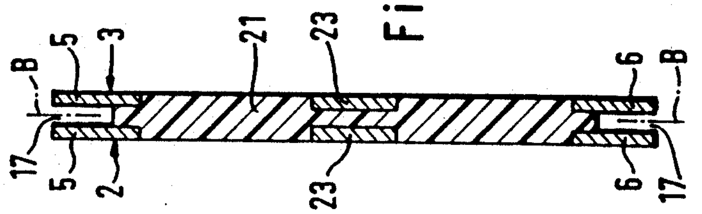
FIG. 15 is a section view taken along line XV—XV of FIG. 14.

FIGS. 13 to 17 show an embodiment of the guide bar 1 wherein the frame 4 of each side part 2 and 3 has a center strut 23 having a center line lying in the longitudinal center plane A—A. This center strut 23 extends from the clamping portion 8 outwardly up to the connecting strut 20. The center strut 23 can however also extend up to the nose portion 7 and especially when a connecting strut 20 is not provided. Transverse struts 22*b* are configured so as to be one piece with the center strut 23 and each of the tongues 18. The transverse struts 22*b* are aligned approximately perpendicular to the center strut 23. Each second tongue 18 of the longitudinally extending legs 5 and 6 is extended to a transverse strut 22*b* which is offset outwardly from the corresponding tongue 18 so that the center strut 23 and the transverse strut 22*b* lie for the most part with their length at the outer side of the side part 2 or 3 corresponding thereto as shown in FIG. 17.

Figure 13:
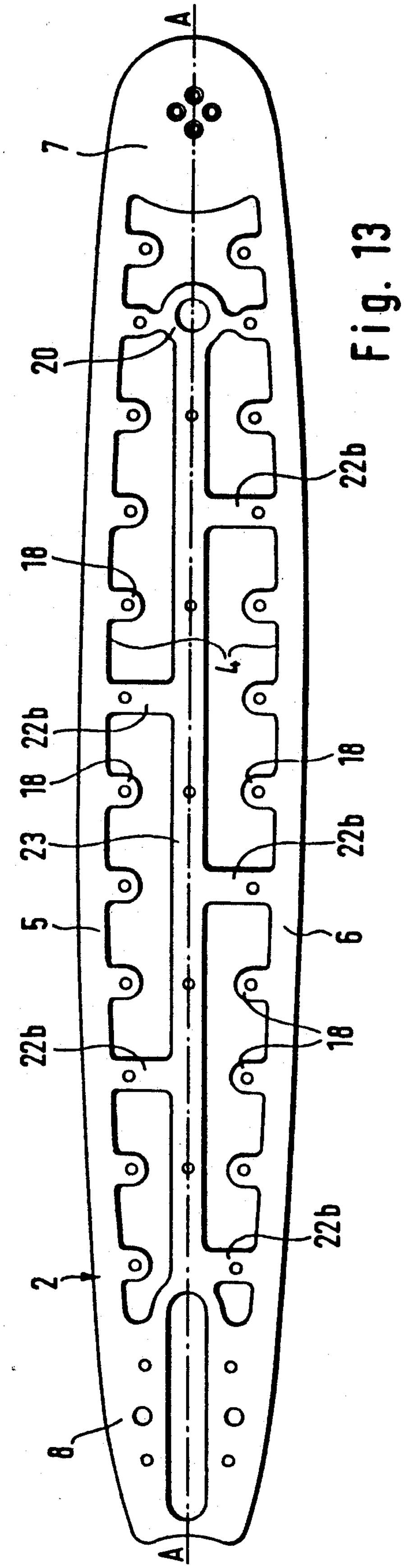
FIG. 13 is a side elevation view of a side part of a guide bar having a longitudinally extending center strut.
Figure 14:
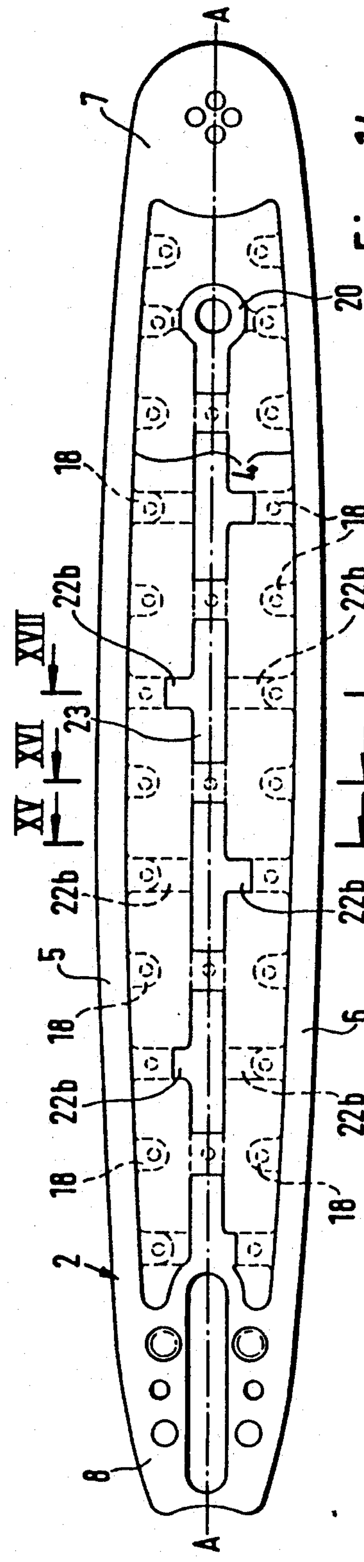
FIG. 14 is a side elevation view of a guide bar having side parts corresponding to the side parts shown in FIG. 13.

In FIG. 13, only the side part 2 is shown for clarity and in the form which it has after being stamped from a steel sheet and with no offset yet impressed thereon. FIG. 13 shows that between two transverse struts 22*b* extending from the longitudinally extending leg 5, three exposed tongues 18 are provided. Likewise, three exposed tongues 18 are disposed between the connecting strut 20 and the next adjacent transverse strut 22*b*. A frame opening extends from the clamping portion 8 and has two freely extending tongues 18. In addition to the connecting strut 20, three transverse struts 22*b* are present on the opposite-lying side referred to the longitudinal center plane A—A. The three transverse struts 22*b* are displaced with respect to the transverse strut 22*b* of the other side and which bound two frame openings each having three exposed tongues 18. The two frame sides having the longitudinally extending legs 5 and 6 are unsymmetrical with reference to the longitudinal center plane A—A; however, they are so configured that the two side parts 2 and 3 can be configured so as to be identical and, by turning over one of the side parts about the center line lying in the longitudinal center plane A—A, the side parts can be joined to form a common composite frame comprising the two frames 4. Each two transverse struts 22*b* of the two frames, respectively, are shown in FIG. 14 as being aligned with respect to each other and each two mutually adjacent tongues 18 are disposed between each two of these strut pairs on the two legs 5 and 6, which are not extended to a transverse strut. In each of the regions between these mutually adjacent tongues 18, there is a center strut 23 which is offset inwardly and the offset portions connected to each other and lying adjacent to each other conjointly define the spacers 19 corresponding to the offset tongues 18.

In this embodiment, an especially high stiffness results also with reference to bending forces which act transversally to the longitudinal center plane A—A because also the center struts 23 take up compressive and tensile forces which occur perpendicularly to the longitudinal center plane A—A. The center struts 23 are for the most part on the outer sides of the guide bar and lie at a spacing from the center plane B—B and for this reason take up the pressure and tensile forces. Because of this stiffening of the frame by the transverse struts 22*b* and the center strut 23, this guide bar has a high bending and torsion stiffness. The composite frame comprising the two frames 4 is likewise filled with plastic 21 which can be injected or poured and cover the offset strut portions.

FIGS. 18 to 23 show various embodiments for the spacers 19.

FIG. 18*a* is a cutaway view of the longitudinally extending leg 5 in the region of a tongue 18 shown enlarged. FIGS. 18*b* and 18*c* show respective section views taken along the section line shown in FIG. 18*a*. Two legs 5 with the tongues corresponding thereto are shown before welding and after welding the tongues in FIGS. 18*b* and 18*c*, respectively. Each tongue 18 is offset from the leg 5 corresponding thereto in a direction toward the opposite lying tongue 18 of the other leg 5. The offset is produced by a stamping operation. At the same, a circular depression 25 is stamped into each tongue 18 whereby the two tongues 18 have respective bosses 25*a* formed in the two sides of the tongues 18 facing each other. The two tongues are welded to each other by applying an electric welding current while simultaneously pressing the two tongues together with the current flowing through the contact location of the two bosses 25*a*. The metal is caused to flow in this manner so that the two tongues 18 are welded to each other and the planar form of FIG. 18*c* is obtained under the applied pressure. The portions of the tongues 18 welded together conjointly then define the spacers 19.

FIG. 18*d* is a section view corresponding to the section line of FIG. 18*a* wherein the tongue 18 is shown which is offset from the leg 5 and wherein a rivet hole 26 is provided in the offset region. In this embodiment, two tongues 18 mutually adjacent with the offsets are connected by a rivet which is formed by injected plastic in a manner similar to the connection of the rivet holes 12 of FIG. 2. Here, the welding operation is unnecessary so that the production of the guide bar is especially economical. The depression 27 formed by the offsets is filled during injection of the composite frame with plastic with the composite frame comprising the two frames 4. In this way, a planar surface as the outer side of the guide bar is provided together with the outer surfaces of the tongues 18 and the legs 5 and 6.

Figure 18:
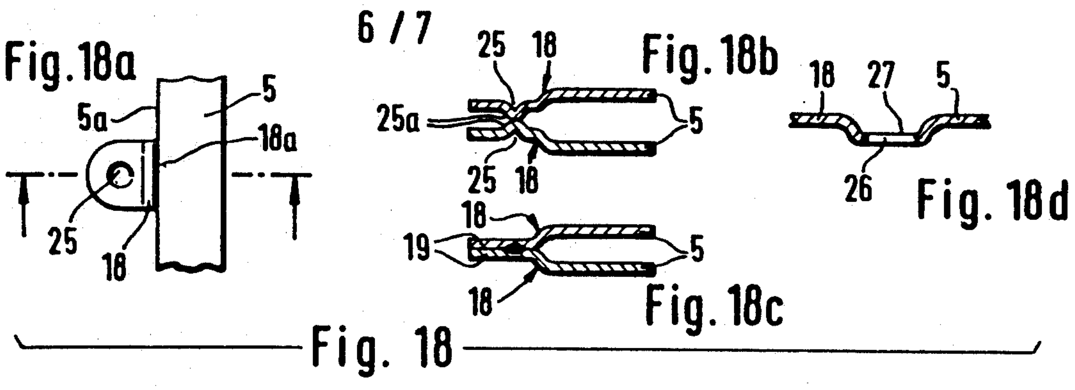
FIG. 18*a* is a cutaway portion of the guide bar in the region of the frame showing the offset tongues.
FIG. 18*b* is a section view showing two offset tongues in advance of joining the two mutually adjacent tongues.
FIG. 18*c* is a section view of the two tongues of FIG. 18*b* after they have been joined.
FIG. 18*d* is a section view of a modified tongue.

In the embodiment of FIG. 18, the tongues 18 are offset along a straight line 18*a* which is aligned with the inner edge 5*a* of the leg 5. This is especially advantageous when preformed plates are used for filling the two composite frames 4 and which can, for example, be made of plastic. The insert plates can then be configured with an outer contour which runs essentially continuously and which corresponds to the trace of the inner edge of the frame 4. Depressions can be provided for the tongues 18 in the event that the insert plates have a greater thickness. When configuring the frame with transverse struts and possibly with a center strut as shown in FIGS. 7, 9 and 14, the inserted plastic plates must only have additional cutouts at those locations at which the outer surfaces of the transverse struts and the center strut lie in the same plane as the outer surfaces of the longitudinally extending legs 5 and 6.

Figure 19:
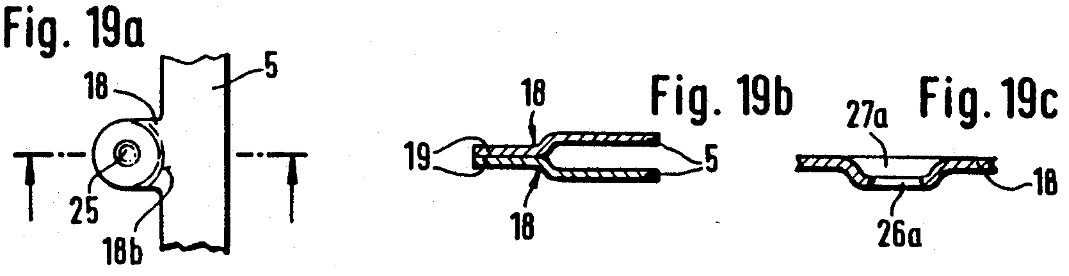
FIG. 19*a* is a cutaway plan view of another embodiment of the tongues for joining the side parts.
FIG. 19*b* is a section view of the two tongues after they are joined.
FIG. 19*c* shows an alternate embodiment, in section, of one of the two tongues.

An embodiment of the tongues 18 is preferred as shown in FIG. 19 when an especially high strength of the guide bar is to be obtained. Here, the offset line 18*b* runs in an arc (in the embodiment shown in the form of a circular arc concentric to the center point of the depression 25) which is configured in the manner of FIG. 18*b* and defines a corresponding boss for welding. The tongue is here too offset by a pressing operation with the arcuately-shaped offset line 18*b* leading to more favorable stress relationships in the material during forming compared to the offset line 18*a* as shown in FIG. 18*a*. Furthermore, a higher strength of the composite frame is obtained compared to the straight-line offset because the arcuately-shaped offset tongues have a higher bending stiffness at the transition to the longitudinally extending legs 5 and 6.

FIG. 19*b* shows a section along the section line of FIG. 19*a* after the mutually adjoining tongues 18 are welded. The depressions 25 define welding bosses as in FIG. 18*b* and are welded in the same manner so that the mutually adjoining tongue portions, which in this case are circular, define the spacers 19.

In the alternate embodiment of FIG. 19*c*, a depression 27 is formed by means of a pan-shaped deformation of the tongue 18. A rivet hole 26*a* is provided in the base of this deformation so that in this case the mutually adjoining tongues 18 are connected by a rivet which can be formed by the injected plastic mass as described with reference to FIG. 18*d*. The tongues 18 of FIGS. 18*b* and 19*b* can be configured in the same manner so that the tongues have cutouts for accommodating the rivets in lieu of the weld bosses 25*a*.

A further variation (not shown) of the embodiments of FIGS. 18 and 19 provides that for the joining locations, an offset tongue 18 is provided on only one of the two longitudinally-extending legs 5; whereas, the other tongue lies in the same plane as the other longitudinally extending leg. For this configuration, offset and non-offset tongues can be provided alternately on the two longitudinally extending legs in such a manner that the offset tongue lies opposite a non-offset tongue to thereby conjointly define the spacer.

Figure 20:
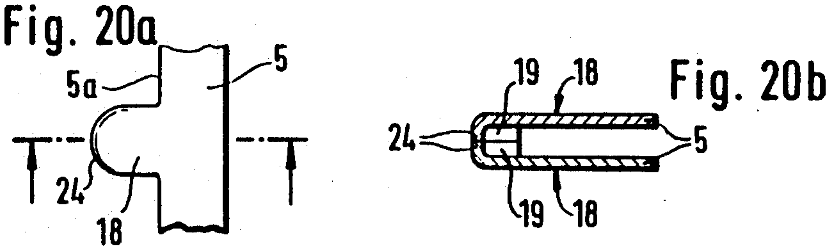
FIG. 20*a* is a plan view of a cutaway portion of the guide bar showing another embodiment of the tongues.
FIG. 20*b* is a section view of the two tongues of FIG. 20*a;*

FIG. 20 shows a further embodiment of the tongues 18. These tongues 18 have a circularly-shaped arc-like edge 24 at their end faces which extends into side edges of the tongue 18 running approximately at right angles to the inner edge 5*a* of the longitudinally extending leg 5. FIG. 20*b* shows, in a section view corresponding to the section line of FIG. 20*a*, that only the arc-shaped edge 24 of the tongues 18 is offset which tongues lie in the same plane as the corresponding leg 5. The two offset edges 24 of the two tongues 18 are welded to each other and define the spacer 19. This embodiment is especially advantageous when the two frames 4 or the composite frame comprising the frames 4 is filled with an insert plate which is made of a specific light material such as plastic. Such insert plates are provided at the locations of the tongues 18 with correspondingly formed cutouts which border on the side edges and on the offset edge 24 of the tongues.

If the frames 4 are provided with transverse struts and possibly with a center strut in correspondence to FIGS. 7, 9 or 14, then cutouts or depressions are provided on the insert plates at those locations at which these struts form a part of the outer surfaces of the guide bar. If the center strut of FIG. 14 has offsets as spacers 19, the insert plates must have corresponding depressions. The configuration of the insert plates with cutouts corresponding to the tongues of FIG. 20 results in an almost completely even outer surface at both sides of the guide bar, because between the tongues and the corresponding insert plates, only a gap of negligible width is present. The gap width is so small also on the boundary lines to the transverse struts and the center strut (FIGS. 7, 9 and 14) that the gap does not disturb the outer surface.

Figure 21:
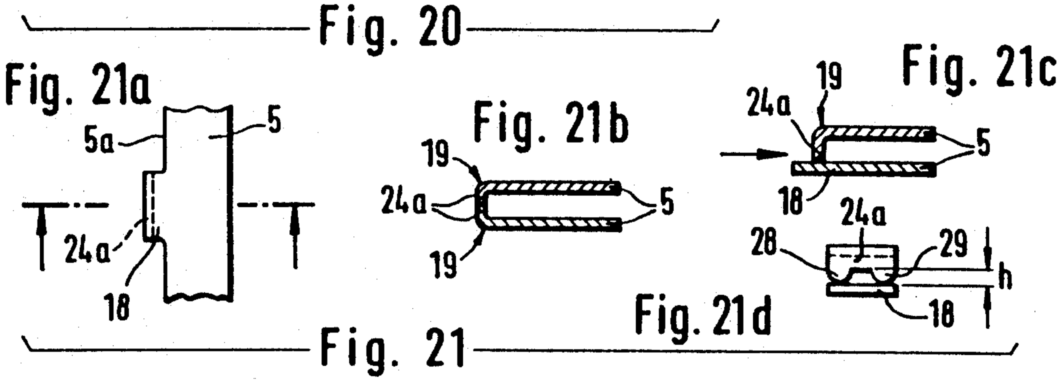
FIG. 21*a* is a cutaway portion of the guide bar showing a plan view of another embodiment of the tongues wherein each tongue is bent at an angle.
FIG. 21*b* is a section view of the two tongues of FIG. 21*a*.
FIG. 21*c* is an embodiment related to the embodiment of FIG. 21*a* but with only one tongue being bent at an angle.
FIG. 21*d* is a end view of the tongue configuration shown in FIG. 21*c* when viewed in the direction of the arrow with the two parts being shown in advance of joining the tongue with the adjacent side part.

FIG. 21 shows embodiments wherein the particular spacers 19 are defined by an offset edge similar to that shown in FIG. 20. FIG. 21*b* shows a section view taken along the section line of FIG. 21*a*. FIGS. 21*a* and 21*b* show that a short tongue 18 is provided on each longitudinally extending leg 5. This tongue 18 has an edge 24*a* which is bent over near the inner edge 5*a* of the leg 5 so that this offset edge 24*a* defines the spacer 19. In the embodiment of FIG. 21*b*, both tongues 18 are offset in this manner.

FIG. 21*c* shows that it is also possible to provide only one of the two legs 5 with one such linear offset edge 24*a* which forms the spacer 19 and which seats on the other leg 5 which is configured to be completely flat. The planar leg 5 can have projecting tongues 18 corresponding to the view of FIG. 21*a* at the locations of the spacers 19, however, without the offset edge 24*a* shown there.

FIG. 21*d* shows an end view in the direction of the arrow shown in FIG. 21*c* in advance of welding the offset edge 24*a* to the tongue 18 of the other leg 5. In this condition, the edge 24*a* has two projections 28 and 29 having the elevation (h). These projections form welding bosses similar to the welding bosses 25*a* in FIG. 18*b*. The metal of the weld bosses is caused to flow by the welding current and is so formed under pressing pressure that a linear weld edge is produced between the edge 24*a* and the tongue 18. Such weld bosses 28 and 29 can also be provided when both legs 5 have tongues 18 offset as shown in FIG. 21*b*. The embodiment corresponding to those shown in FIGS. 21*c* and 21*d* having tongues offset at the edges and provided at only one of the two legs can also be provided for the configuration of the tongues of FIG. 20.

Figure 22:
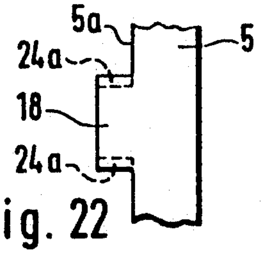
FIG. 22 is a cutaway plan view of an alternate embodiment of the tongue.

FIG. 22 shows a variation of the embodiment of FIG. 21. Here, the tongue 18 is offset not at its end face, rather, at the two edges at right angles to the inner edge 5*a* of the leg 5 so that two linear offset edges 24*a* are provided which define the spacers 19 and which can be welded to the corresponding tongue of the other leg in the same manner as explained with respect to FIGS. 21*b* to 21*d*.

In the embodiment of FIG. 21*c*, only one tongue of a longitudinally-extending leg is offset and the tongue of the other longitudinally-extending leg is planar. In this embodiment, and for reasons of manufacture, every second tongue is offset on the two legs 5 and 6 of the two frames 4 and each of the tongues lying between the offset tongues is planar. The side parts 2 and 3 can then be configured so as to be completely identical as in the other embodiments so that the side parts, after turning over one of the side parts about the longitudinal center line lying in the plane A—A (FIG. 1), can be joined to each other and welded together.

The configuration of the tongues of FIGS. 20 to 22, as described, has the advantage that for filling the two frames 4, correspondingly formed plates made of specific light material can be used but also aluminum or a similar light metal can be used in lieu of plastic. In this embodiment of the side parts, the composite frame welded together from the two frames 4 can be injected or filled out by pouring in a suitable material such as plastic.

Figure 23:
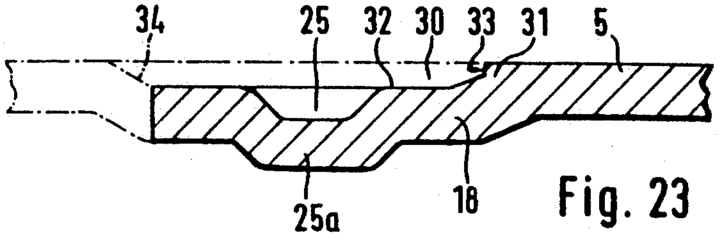
FIG. 23 is a section view, enlarged, taken through a tongue being formed to have a cup-like shape.

FIG. 23 shows, in section, an enlarged view taken along the section line of FIG. 19*a* for explaining a preferred method according to the invention for producing the guide bar.

As described with reference to FIGS. 13 and 14, it is possible to first stamp the contour of the side part with all cutouts from a planar steel plate so that the frame 4 is produced and so that the cutouts are formed also in the nose portion 7 and in the clamping portion 8. However, it is advantageous to first produce the formations required for the spacers in a still solid steel plate by forming operations and especially by pressing.

In FIG. 23, the section view of the leg 5 and of the tongue 18 is supplemented by broken lines so that the first forming by pressing can be seen. First, a plate-shaped depression 30 is formed while at the same time the depression 25 is impressed and also the boss 25*a* is produced (FIG. 18*b*). Thereafter, the frame 4 is stamped with the tongues 18 being stamped out and the parts shown by broken lines are removed. In this way, the tongue 18 is produced. By pressing, the transitions from the longitudinal strut 15 into the tongue 18 and the transitions in the region of the depression 25 or of the boss 25*a* are so selected that no material fissures result from forming the offset.

FIG. 23 also shows a special aspect of the forming method. At the transition location between the depression 30 and the adjacent portion of the tongue 18, an impression 31 is formed whereby a contact surface 33 is formed approximately perpendicular to the surface 32 of the offset portion with the contact surface 33 extending in correspondence to the offset line 18*b* (FIG. 19*a*) having a shape corresponding to a circular arc. If the filling material such as plastic is injected or filled into the composite frame formed from the two frames 4, then the plastic flows against the contact surface 33 whereby a completely gap-free transition is provided from the filler material to the frame. For a crossover running at an angle, as shown at the edge 34 (broken line) of the portion removed later by stamping, such a gap-free transition from the filler material to the frame would not be possible because the injected or poured material would not completely fill out the corresponding angle.

The described impression 31 can be provided at all offsets which form a depression to be filled with the filler material, that is, even at the tongues corresponding to FIG. 18 and at the transverse struts 22, 22*a* and 22*b* as well as at the center strut 23 of FIGS. 7, 9 and 14.

In all of the embodiments of the guide bar described having frames on which tongues are provided for forming the spacers and plastic is injected for filling the composite frame, the base of the guide groove 17 is made of the plastic as shown in FIGS. 2 to 6, 8, 10 to 12 and 15 to 17. This affords special advantages for the operation of the chain saw equipped with such a guide bar. The saw chain extends with its spacer links or its drive links into the guide groove 17 whereas the other chain links slide on the end faces of the side parts 2 and 3. Unavoidable wear takes place at these end faces so that the saw chain would be lifted upwardly somewhat from the guide bar when the spacer links or drive links ride on the groove base made of a relatively wear-resistant material. If this would be avoided by a greater depth of the groove with respect to the engaging depth of the spacer links of the saw chain, then an increased requirement of lubricating oil would result. In contrast, if the base of the guide groove 17 formed by plastic or another material which is not resistant to wear, then the chain links extending into the guide groove would abrade somewhat the material of the base of the groove so that the engaging depth of the saw chain would be maintained notwithstanding the wear of the end faces of the side parts 2 and 3.

The injection or pouring of a light material such as plastic also makes possible a rivet connection of the spacers as shown in FIG. 2. Here, it is advantageous to configure the rivet holes to be conical in order to ensure a tight and stable connection.

In addition to welding or riveting, the connection of the spacers can be produced in another manner such as by adhesive. A laser welding is also possible for this connection.

Figure 24:
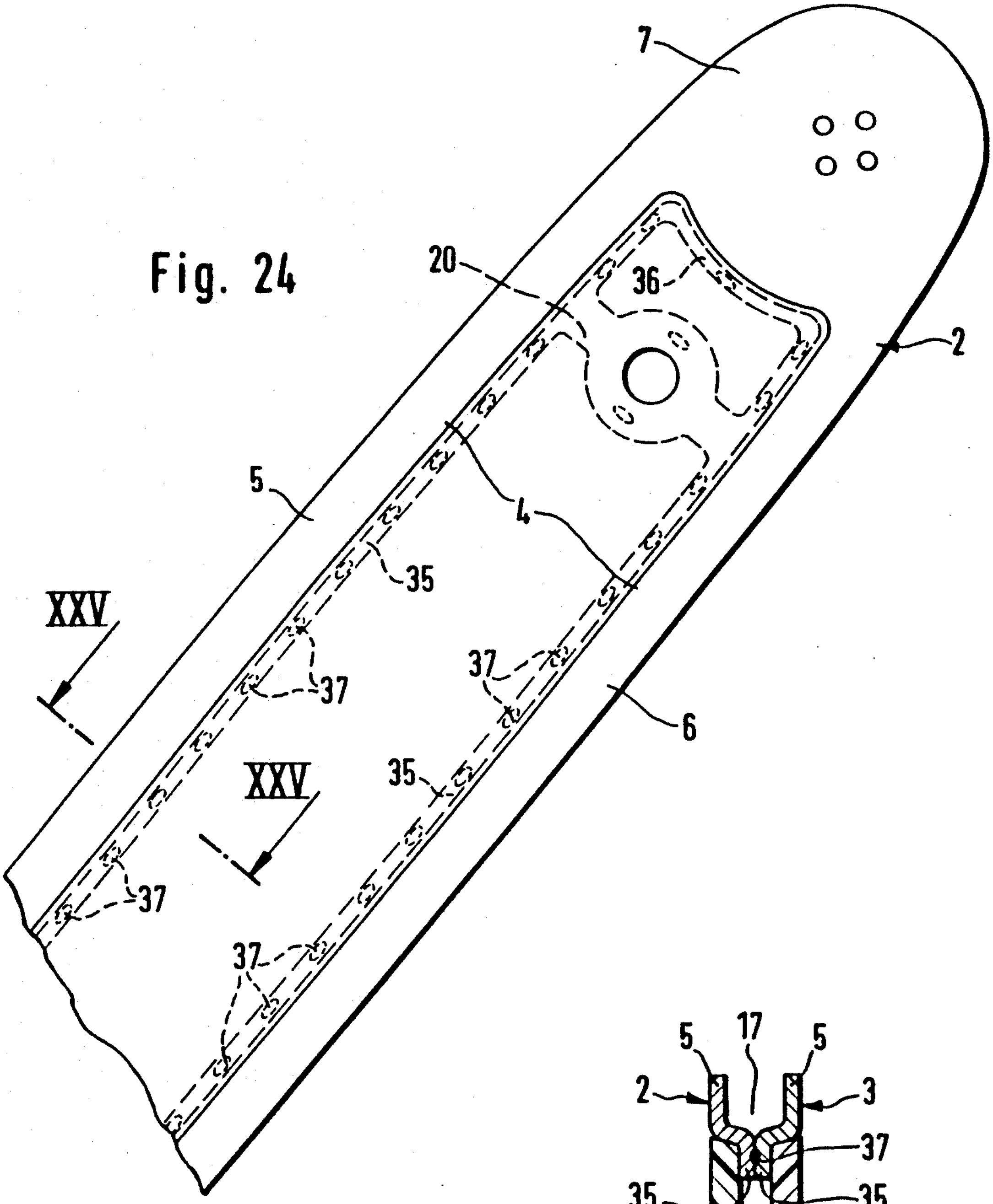
FIG. 24 shows a side elevation view of a portion of a guide bar according to another embodiment of the invention; and, FIG. 25 is a section view taken along line XXV—XXV of FIG. 24.
Figure 25:
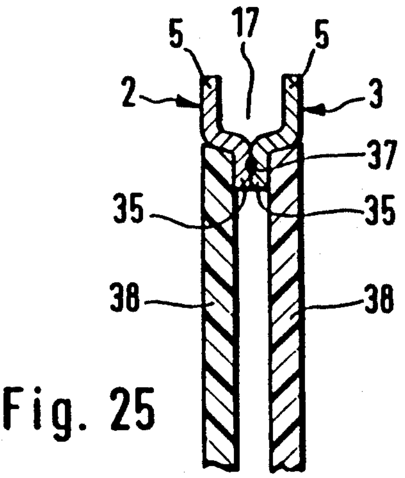

In FIGS. 24 and 25, an embodiment of the guide bar 1 is shown which likewise is assembled from two parts with the two side parts 2 and 3 being configured as frames over the greatest part of their lengths in correspondence to the embodiments described. The longitudinally extending legs 5 and 6 are correspondingly very narrow so that the frame opening is maintained as large as it is still adequate for the stability of the guide bar. The legs 5 and 6 are offset over their entire lengths to form a continuous edge 35. The nose portion 7 as well as the clamping portion 8 (not shown) likewise has an offset inner edge 36 which extends over into the edges 35 of the legs 5 and 6. The edges 35 and 36 of the two frames 4 which are mutually adjoining are welded to each other with uniform spacing. A spot welding as shown in FIG. 25 or even a boss welding as shown in FIGS. 18*b* and 18*c* can be provided.

Sufficient welding locations 37 are provided in order to ensure a fixed connection of the two side parts 2 and 3, that is, of the two frames 4. Into each of the two frames 4, a plate 38 is inserted which is made of a specific light material which can especially be plastic. These plates 38 can be joined by adhesive to the frames 4. Likewise, these plates can be clipped into the metal frame or clipped to each other. An injection of the frame with plastic is especially simple because of the closed inner contour. It is also possible, in lieu of weld connections, to provide rivet holes at the locations 37 and the two mutually adjoining frames can be filled out by injecting plastic or a specific light material or can be filled by pouring with the connection of the two frames or side parts being produced by the rivet connection formed in this manner.

In the embodiments of FIGS. 24 and 25, the two side parts 2 and 3 with their offset edges 35 form the base of the guide groove 17. This two-part configuration of the guide bar is especially simple and therefore economical in manufacture and has a very low weight because of the specific light filler material utilized with a very large inner opening of the composite frame 4. The bending and torsion stiffness of the guide bar is nonetheless adequate. Transverse struts can be provided as shown in FIGS. 7 and 9 to improve the stiffness/and the struts can be configured as one piece with the corresponding frame 4. However, these transverse struts can also be subsequently seated in the frame.

It is understood that the foregoing description is that of the preferred embodiments of the invention and that various changes and modifications may be made thereto without departing from the spirit and scope of the invention as defined in the appended claims.

What is claimed is:

1. A guide bar for guiding the saw chain of a chain saw, the guide bar comprising:

two mutually adjacent elongated parallel side parts defining respective side frames having a predetermined length and being spaced from each other at a predetermined spacing to conjointly define an outer peripheral guide groove for guiding the saw chain on the guide bar;

each of said side frames having an inner periphery defining an opening and each of said frames having upper and lower continuous legs extending longitudinally over most of the length o said guide bar;

the two upper legs of said side frames conjointly defining an upper segment of said guide groove over most of said length and the two lower legs of said side frames conjointly defining a lower segment of said guide groove over most of said length;

each of said legs having an inner edge defining an portion of said inner periphery;

a plurality of projections formed on the inner edges of each one of said side frames to define a plurality of spaces for holding said side frames at said spacing and for rigidly joining said side frames to each other to define a composite frame of the guide bar;

each of said frames having respective side surfaces;

said projections being a plurality of tongues formed as a single piece with the leg corresponding thereto and being connected to the spacer of the corresponding leg;

said tongue being configured to extend toward a longitudinal center plane extending perpendicularly to the side surfaces of said frames;

said spacers of said one side frame being welded to the spacer of other one of said side frames;

each of said side frames being made of a material having a high resistance to bending; and, a substance having a specific low weight and said substance filling out said composite frame.

2. The guide bar of claim 1, said projections having respective offset portions defining said spacers.

3. The guide bar of claim 2, said portions being formed by pressing.

4. The guide bar of claim 1, said tongues being disposed at equal spacing one form the other on the leg corresponding thereto.

5. The guide bar of claim 1, said tongues being offset from the inner edge of the leg corresponding thereto.

6. The guide bar of claim 1, each of the tongues being offset by pressing which causes the offset to have a rounded edge bordering on a planar surface formed by the leg corresponding to the tongue and a component region of the tongue.

7. The guide bar of claim 1, each of said tongues and the leg corresponding thereto conjointly defining a common plane; and, each of said tongues having an outer bent over edge portion to define a part of one of said said spacers.

8. The guide bar of claim 7, said bent over edge portion having an end face; and, said end face having an arcuate shape.

9. The guide bar of claim 7, said bent over edge portion having an end face; and, said end face being linear.

10. The guide bar of claim 1, said side frames being rigidly connected to each other by said spacers.

11. The guide bar of claim 10, both of said side frames having said spacers formed thereon; and, the spacers of said one side frame being welded to the spacers of said other side frame.

12. The guide bar of claim 10, both of said side frames having said spacers formed thereon; and, the spacers of said one side frame being riveted to the spacers of said other side frame.

13. The guide bar of claim 1, each of said frames including at least one transverse strut for connecting the upper leg thereof to the lower leg thereof thereby stiffening the frame.

14. The guide bar of claim 13, said upper and lower legs of each frame having respective outer surfaces; said transverse strut of each frame having an outer surface; and, said outer surface of said strut over most of the length of said strut being in a common plane with said outer surfaces of said legs.

15. The guide bar of claim 13, each of said frames having respective side surfaces; and, said transverse strut being arranged so as to extend at an angle to a longitudinal center plane extending perpendicular to said side surfaces of said frames.

16. The guide bar of claim 15, wherein the struts of said frames mutually cross over; the struts extending toward the location of the crossover conjointly defining an angle in the range of 60° to 120°.

17. The guide bar of claim 16, said struts being offset toward each other at the location of the crossover and being jointed to each other at the crossover.

18. The guide bar of claim 15, each of said frames having respective side surfaces; said projections formed on the inner edges of both of said side frames and being a plurality of tongues formed as a single piece with the leg corresponding thereto; said tongues being configured so as to extend toward a longitudinal center plane extending perpendicular to the side surfaces of said frames; and, said transverse strut connecting a tongue of the upper leg to a tongue of the lower leg.

19. The guide bar of claim 18, said transverse strut being formed as a single piece with the two tongues interconnected thereby.

20. The guide bar of claim 13, each of said frames including additional struts to form a plurality of struts arranged so as to be parallel to each other.

21. The guide bar of claim 1, each of said frames including at least one center strut extending over most of the length of said frame; and, at least two transverse struts connecting respective ones of the legs to said center strut.

22. The guide bar of claim 1, said side frames being made to each have the same configuration as the other; and, the guide bar being configured so as to be symmetrical with respect to said longitudinal center plane.

23. The guide bar of claim 1, at least one of said tongues of each frame extending into said center plane to conjointly define a spacer in said center plane.

24. The guide bar of claim 1, said material being selected from the group consisting of metal, a metal alloy and steel; and, said substance being plastic.

25. The guide bar of claim 24, said substance being in the form of at least one plate made of said substance and being held in said plate in a form-tight manner.

26. The guide bar of claim 24, said plastic being injected into said composite frame so as to cover said spacers.

27. The guide bar of claim 24, said plastic being poured into said composite frame so as to cover said spacers.

28. The guide bar of claim 1, each of said side parts being configured as a single piece.

29. A guide bar for guiding the saw chain of a chain saw, the guide bar comprising:

two mutually adjacent elongated parallel side parts defining respective side frames having a predetermined length and being spaced from each other at a predetermined spacing to conjointly define an outer peripheral guide groove for guiding the saw chain on the guide bar;

each of said side frames having an inner periphery defining an opening and each of said frames having upper and lower continuous legs extending longitudinally over most of the length of said guide bar;

the two upper legs of said side frames conjointly defining an upper segment of said guide groove over most of said length and the two lower legs of said side frames conjointly defining a lower segment of said guide groove over most of said length;

each of said legs having an inner edge defining a portion of said inner periphery;

each of said side frames having a plurality of projections extending from the inner edge thereof so as to be integral with the frame and to define a plurality of spacers disposed in the opening defined by said inner periphery of the frame;

the spacers of one of said frames coacting with the spacers of the other one of said frames for holding said frames at said spacing;

joining means applied to said spacers for rigidly joining said side frames to each other to define a composite frame;

the upper leg and the lower leg of each of said frames having an outer exposed surface facing away from the guide groove;

said outer exposed surfaces of the first one of said frames defining a first common plane and the outer exposed surfaces of the second one of said frames defining a second common plane;

plastic filler means for filling out said openings defined by said frames to form a plastic filler body extending between said first and second common planes and at least partially embedding said spacers therein;

said plastic filler body having first and second outer exposed surfaces disposed in first and second common planes, respectively;

said first outer exposed surface of said plastic filler body and the outer exposed surfaces of said first frame conjointly defining a first composite outer side surface of said guide bar; and, said second outer exposed surface of said plastic filler body and the outer exposed surfaces of said second frame conjointly defining a second composite outer side surface of said guide bar.

30. The guide bar of claim 29, said side frames each being made of a material having a high resistance to bending.

31. The guide bar of claim 30, said material being selected from the group consisting of metal, a metal alloy and steel.

32. A guide bar for guiding the saw chain of a chain saw, the guide bar comprising:

two mutually adjacent elongated parallel side parts defining respective side frames having a predetermined length and being spaced from each other at a predetermined spacing to conjointly define an outer peripheral guide groove for guiding the saw chain on the guide bar;

each of said side frames having an inner periphery defining an opening and each of said frames having upper and lower continuous legs extending longitudinally over most of the length of said guide bar;

the two upper legs of said side frames conjointly defining an upper segment of said guide groove over most of said length and the two lower legs of said side frames conjointly defining a lower segment of said guide groove over most of said length;

each of said legs having an inner edge defining a portion of said inner periphery;

a plurality of projections formed on the inner edges of at least one of said side frames to define a plurality of spacers for holding said side frames at said spacing and for rigidly joining said side frames to each other to define a composite frame;

each of said frames having respective side surfaces;

said projections being a plurality of tongues formed as a single piece with the leg corresponding thereto;

said tongues being configured so as to extend toward a longitudinal center plane extending perpendicularly to the side surfaces of said frames;

said spacers of said one side frame being welded to the other one of said side frames;

each of said side frames being made of a material having a high resistance to bending; and, a substance having a specific low weight and said substance filling out said composite frame.

* * * * *

UNITED STATES PATENT AND TRADEMARK OFFICE
CERTIFICATE OF CORRECTION

PATENT NO. : 5,249,363
DATED : October 5, 1993
INVENTOR(S) : David Mitrega, Walter Sattelmaier, Klaus Wieninger, Norbert Apfel, Roland Schierling and Bernd Andress

It is certified that error appears in the above-identified patent and that said Letters Patent is hereby corrected as shown below:

In column 3, line 19: delete "a" and substitute -- an -- therefor.

In column 6, line 39: after "openings" add -- , --.

In column 6, line 62: delete "transversally" and substitute -- transversely -- therefor.

In column 7, line 19: between "same" and ",", insert -- time --.

In column 11, line 57: delete "stiffness/" and substitute -- stiffness, -- therefor.

In column 12, line 10: delete "o" and substitute -- of -- therefor.

In column 12, line 20: delete "spaces" and substitute -- spacers -- therefor.

In column 12, line 28: delete "tongue" and substitute -- tongues -- therefor.

In column 12, line 42: delete "spacing" and substitute -- spacings -- therefor.

UNITED STATES PATENT AND TRADEMARK OFFICE
CERTIFICATE OF CORRECTION

PATENT NO. : 5,249,363

DATED : October 5, 1993

INVENTOR(S) : David Mitrega, Walter Sattelmaier, Klaus Wieninger, Norbert Apfel, Roland Schierling and Bernd Andress

It is certified that error appears in the above-identified patent and that said Letters Patent is hereby corrected as shown below:

In column 12, line 42: delete "form" and substitute -- from -- therefor.

In column 12, line 55: delete "said" (second occurrence).

In column 13, line 25: delete "jointed" and substitute -- joined -- therefor.

Signed and Sealed this

Twenty-ninth Day of March, 1994

Attest:

Bruce Lehman

BRUCE LEHMAN

*Attesting Officer* *Commissioner of Patents and Trademarks*